US012734789B2

(12) United States Patent
Liu et al.

(10) Patent No.: US 12,734,789 B2
(45) Date of Patent: Sep. 15, 2026

(54) SUPER-HARD AND SUPER-STRONG EXPLOSION-PROOF GLASS FILM WITH METAL FRAME

(71) Applicant: WTL Technology Shenzhen CO. Ltd., Shenzhen (CN)

(72) Inventors: Tak Nam Liu, Shenzhen (CN); Siu Hoi Liu, Shenzhen (CN); Siu Hei Liu, Shenzhen (CN); Tak Ngai Liu, Shenzhen (CN)

( * ) Notice: Subject to any disclaimer, the term of this patent is extended or adjusted under 35 U.S.C. 154(b) by 93 days.

(21) Appl. No.: 19/000,888

(22) Filed: Dec. 24, 2024

(65) Prior Publication Data

US 2026/0131559 A1 May 14, 2026

(51) Int. Cl.
*B32B 17/10* (2006.01)

(52) U.S. Cl.
CPC .. *B32B 17/10293* (2013.01); *B32B 17/10018* (2013.01); *B32B 2307/554* (2013.01); *B32B 2307/558* (2013.01); *B32B 2307/7145* (2013.01); *B32B 2307/73* (2013.01); *B32B 2457/20* (2013.01)

(58) Field of Classification Search
CPC ........ B32B 17/10293; B32B 17/10018; B32B 2307/554; B32B 2307/558; B32B 2307/7145; B32B 2307/73; B32B 2457/20
USPC .......................................................... 428/192
See application file for complete search history.

(56) References Cited

U.S. PATENT DOCUMENTS

2003/0008151 A1* 1/2003 Araki .................. C09D 127/18 428/421
2016/0107421 A1* 4/2016 Chung .................... B32B 17/00 428/41.8

OTHER PUBLICATIONS

CN 110159162 A Machine Translated (Year: 2019).*

* cited by examiner

*Primary Examiner* — Betelhem Shewareged
(74) *Attorney, Agent, or Firm* — Sam Pierce

(57) ABSTRACT

The present application discloses a super-hard and super-strong explosion-proof glass film with metal frame, including a frame body, a buffer washer and a tempered glass. The frame body is provided with an antibacterial layer, the buffer washer is fixedly connected inside the frame body, and the tempered glass is fixedly connected inside the buffer washer. The lower surface of the tempered glass is fixedly connected with an explosion-proof film, the lower surface of the explosion-proof film is fixedly connected with an impact-resistant layer, the lower surface of the impact-resistant layer is fixedly connected with a substrate, the lower surface of the substrate is fixedly connected with an exhaust layer, and the exhaust layer is provided at the top of the arc surface.

6 Claims, 4 Drawing Sheets

SUPER-HARD AND SUPER-STRONG EXPLOSION-PROOF GLASS FILM WITH METAL FRAME

CROSS-REFERENCE TO RELATED APPLICATIONS

The present application is based upon and claims priority to Chinese patent application No. 2024227857722, filed on Nov. 14, 2024, the entire content of which is incorporated herein by reference.

TECHNICAL FIELD

The present application relates to the technical field of mobile phone accessories, specifically to a super-hard and super-strong explosion-proof glass film with metal frame.

BACKGROUND

An explosion-proof glass film for mobile phones is a kind of film specially designed to protect the mobile phone screen, which is mainly composed of tempered glass, adhesive layer and functional coating. Such explosion-proof glass film has a simple structure and the following disadvantages: 1. The edge of the tempered glass lacks protective measures, so it is easy to break at the edge, causing scratches on the surface of the mobile phone; 2. The explosion-proof effect relies solely on the strength of the tempered glass itself, resulting in poor explosion-proof performance; 3. After the explosion-proof glass film is adhered to the mobile phone, the edge gap between the explosion-proof glass film and the mobile phone is not easy to clean, and the external dust is prone to invade the adhesive layer, which easily breeding bacteria at this position, and easily causing the adhesive layer to be invalid, resulting in white edges.

SUMMARY

The purpose of the present application is to provide a super-hard and super-strong explosion-proof glass film with metal frame to solve the above problems raised in the background.

In order to solve the above technical problems, the present application provides the following technical solution: a super-hard and super-strong explosion-proof glass film with metal frame, including a frame body, a buffer washer and a tempered glass. The frame body is provided with an antibacterial layer, the buffer washer is fixedly connected inside the frame body, and the tempered glass is fixedly connected inside the buffer washer.

Preferably, the frame body is provided with a bending portion, and the bending portion is provided with an arc surface.

Preferably, the frame body is provided with a first groove in which a notch is arranged, a second groove is provided at the position corresponding to the first groove on the buffer washer, and a third groove is provided at the position corresponding to the second groove on the tempered glass.

Preferably, the antibacterial layer is made of nano-silver material.

Preferably, the lower surface of the tempered glass is fixedly connected with an explosion-proof film, the lower surface of the explosion-proof film is fixedly connected with an impact-resistant layer, the lower surface of the impact-resistant layer is fixedly connected with a substrate, the lower surface of the substrate is fixedly connected with an exhaust layer, and the exhaust layer is provided at the top of the arc surface.

Preferably, the upper surface of the tempered glass is fixedly connected with a wear-resistant layer, and a hydrophobic layer is provided on the upper surface of the wear-resistant layer.

The present application provides a super-hard and super-strong explosion-proof glass film with metal frame, with the advantages of: The present application adopts a frame body combined with buffer washer to wrap the edge of the tempered glass, preventing the edge of the tempered glass from breaking, and improves the strength and toughness of the tempered glass through the explosion-proof film and the impact-resistant layer, thus improving the explosion-proof performance. At the same time, the arc surface on the bending portion conforms to the arc of the mobile phone screen to improve sealing and prevent external dust from invasion. Furthermore, by adding the nano-silver antibacterial layer on the frame body, the antibacterial performance is improved and the growth of bacteria in interstitial areas that are not easy to clean is prevented.

BRIEF DESCRIPTION OF THE DRAWINGS

In order to provide a clearer explanation of the embodiments of the present application or the technical solutions in the prior art, the drawings required to be used in the embodiments or the prior art will be briefly introduced below. It is obvious that the drawings in the following description are some embodiments of the present invention, and that for those skilled in the art, other drawings can be obtained according to these drawings without creative labor.

In the figure: 1, frame body; 11, first groove; 12, bending portion; 13, arc surface; 14, antibacterial layer; 15, notch; 2, buffer washer; 21, second groove; 3, tempered glass; 31, wear-resistant layer; 32, hydrophobic layer; 33, explosion-proof film; 34, impact-resistant layer; 35, substrate; 36, exhaust layer; 37, third groove.

DETAILED DESCRIPTION OF THE EMBODIMENTS

In order to make the purpose, technical solution and advantage of the embodiments of the present application clearer, the technical solutions of the present application will be described clearly and completely below in conjunction with the drawings. It is obvious that the described embodiments are parts of the embodiments of the present application rather than all of the embodiments. Based on the embodiments of the present application, all other embodiments obtained by those skilled in the art without creative labor fall within the protection scope of the present application.

Figure 1:
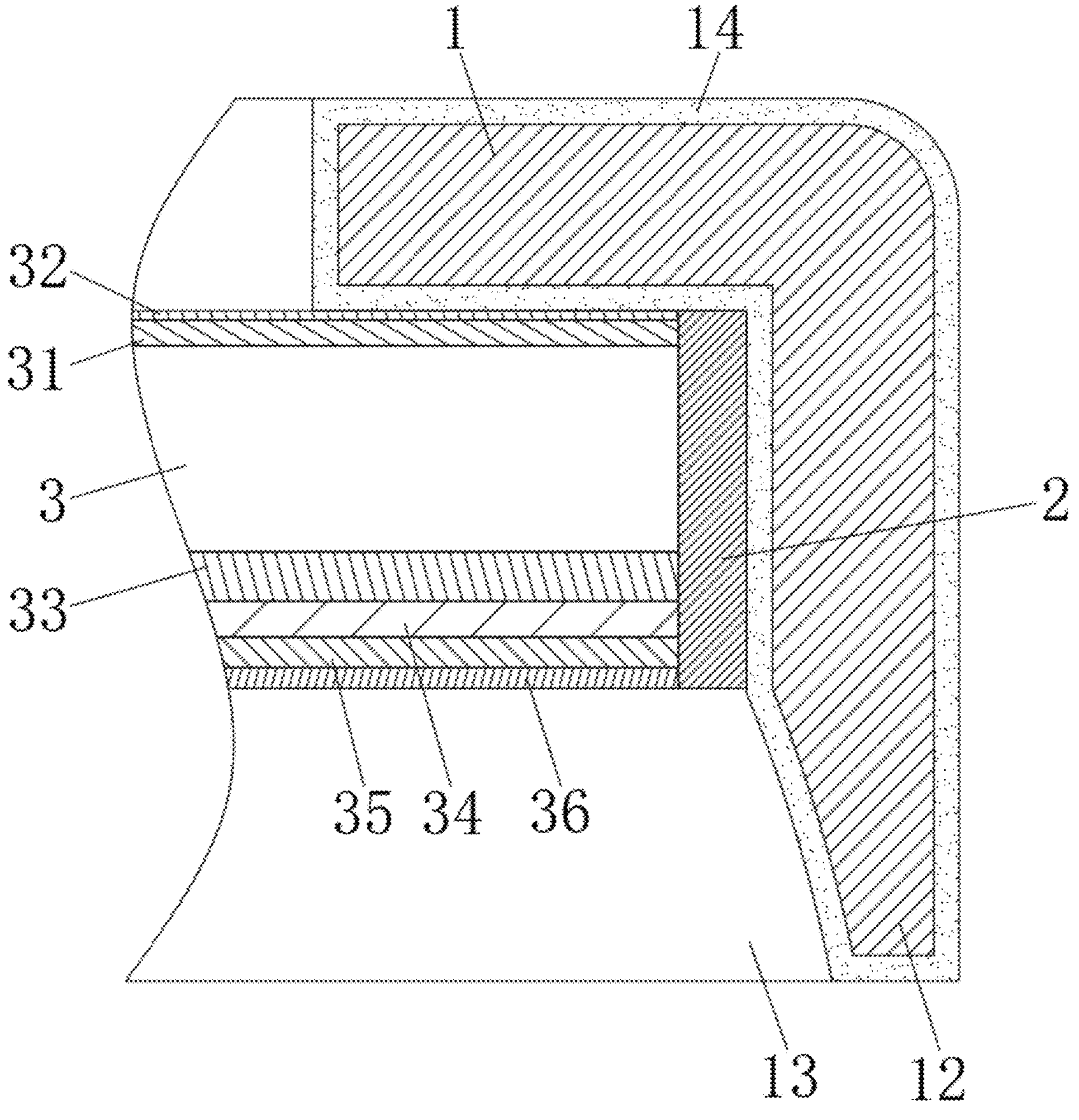
FIG. 1 is a schematic diagram of the overall main sectional structure of the present application.
Figure 2:
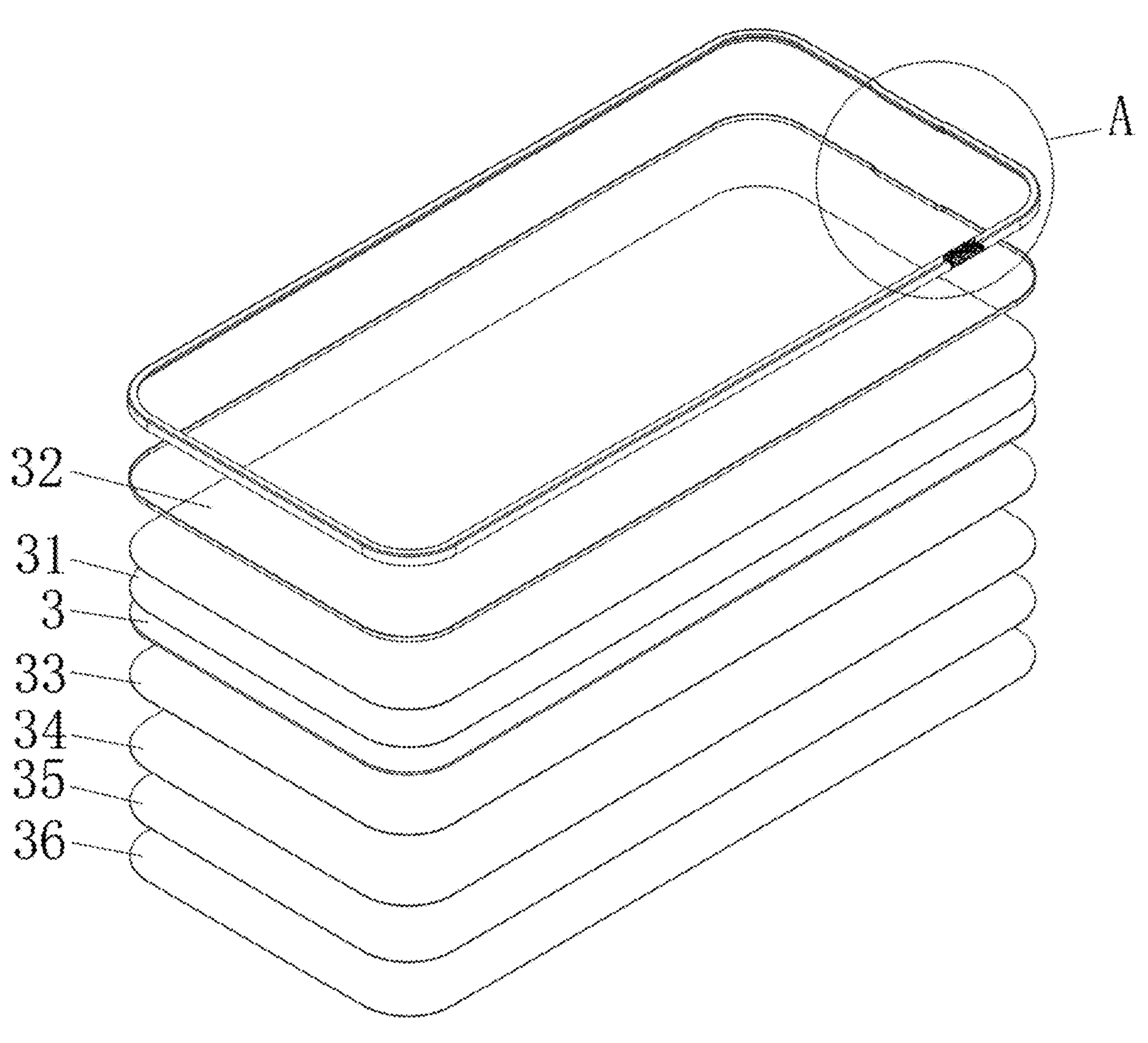
FIG. 2 is the integral three-dimensional structure exploded diagram of the present application.
Figure 3:
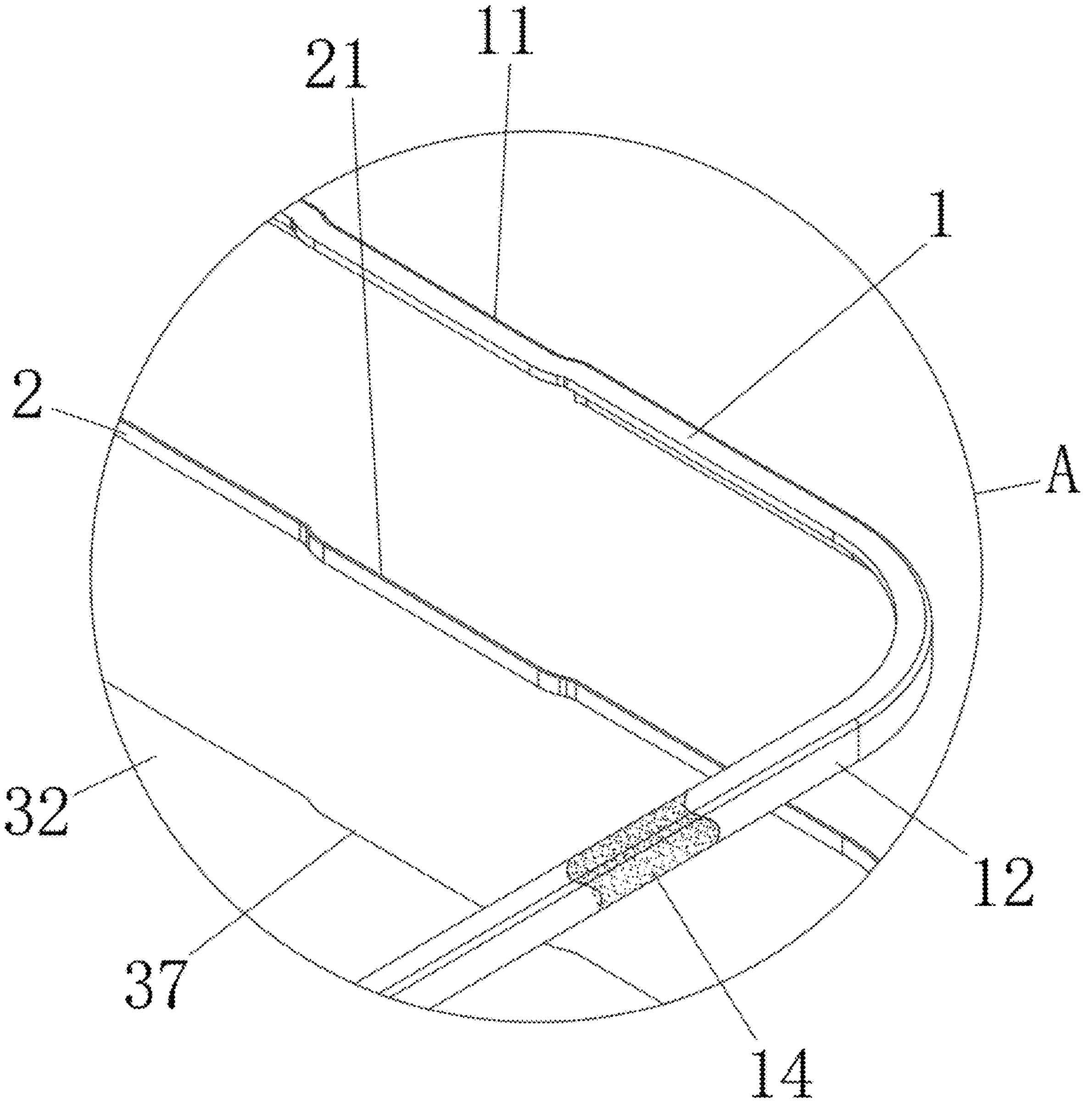
FIG. 3 is a structure enlarged view of area A in FIG. 2.
Figure 4:
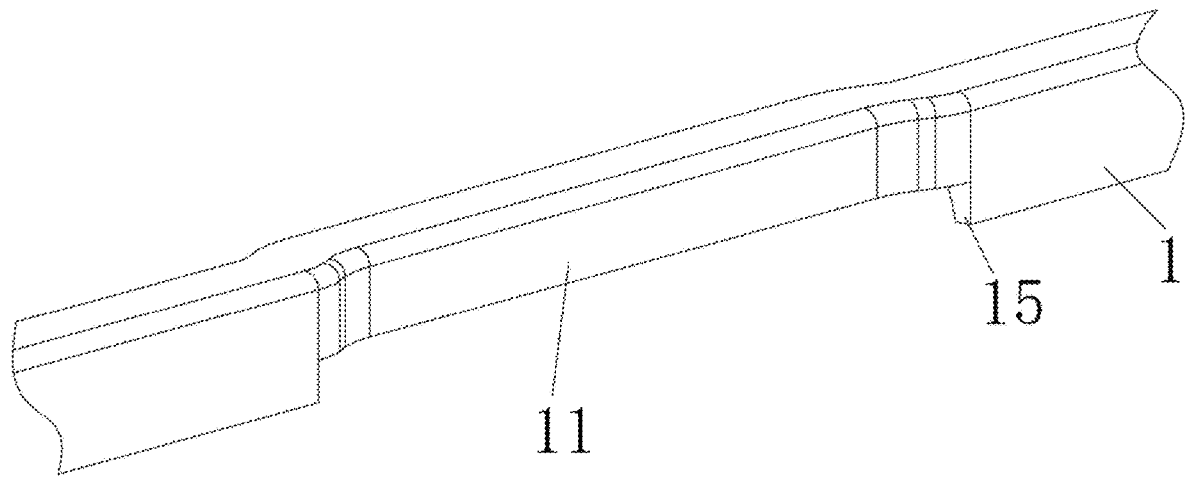
FIG. 4 is a schematic diagram of the three-dimensional structure of the frame body of the present application.

Please refer to the FIG. 1-4, the present application provides an embodiment: a super-hard and super-strong explosion-proof glass film with metal frame, including a frame body 1, a buffer washer 2, and a tempered glass 3. The frame body 1 is provided with an antibacterial layer 14, the buffer washer 2 is fixedly connected to the inside of the frame body 1, the tempered glass 3 is fixedly connected to the inside of the buffer washer 2. The frame body 1 is used for wrapping and protecting the tempered glass 3, the buffer washer 2 is used for realizing the buffer function, so as to prevent the impact force on the side of the frame body 1 from directly acting on the edge of the tempered glass 3, the antibacterial layer 14 is used for preventing bacteria from breeding in interstitial areas between the frame body 1 and the tempered glass 3, and in the gap positions between the frame body 1 and the external screen of the mobile phone.

The frame body 1 is provided with a bending portion 12, which is equipped with an arc surface 13. The bending portion 12 is used for wrapping the edge of the tempered glass 3, and the arc surface 13 is used for adapting to the edge arc of the mobile phone outer screen. The frame body 1 is provided with a first groove 11 in which a notch 15 is arranged, a second groove 21 is provided at the position corresponding to the first groove 11 on the buffer washer 2, and a third groove 37 is provided at the position corresponding to the second groove 21 on the tempered glass 3. The first groove 11 and the notch 15 are used for bypassing the sound outlet hole of the mobile phone, the second groove 21 is used for adapting to the shape of the first groove 11, and the third groove 37 is used adapting to the shape of the second groove 21. The antibacterial layer 14 is made of nano-silver material to realize the antibacterial function.

The lower surface of the tempered glass 3 is fixedly connected with an explosion-proof film 33, the lower surface of the explosion-proof film 33 is fixedly connected with an impact-resistant layer 34, the lower surface of the impact-resistant layer 34 is fixedly connected with a substrate 35, the lower surface of the substrate 35 is fixedly connected with an exhaust layer 36, and the exhaust layer 36 is provided at the top of the arc surface 13. The explosion-proof film 33 is used to increase the overall strength and toughness, prevent fragments splashing; the impact-resistant layer 34 is used to enhance the ability of impact resistance; the substrate 35 is used to further improve the strength and toughness; and the exhaust layer 36 is used to ensure a tight fit with the outer screen of the mobile phone.

The upper surface of the tempered glass 3 is fixedly connected with a wear-resistant layer 31, and a hydrophobic layer 32 is provided on the upper surface of the wear-resistant layer 31. The wear-resistant layer 31 achieves the function of anti-scratch and wear-resistant, and the hydrophobic layer 32 is used to realize anti-fingerprint function and provide a smooth touch sensation.

Working principle: When using the present application, the tempered glass 3 is wrapped and protected by the frame body 1. The tempered glass 3 utilizes the wear-resistant layer 31 to realize the anti-scratch and wear-resistant function; utilizes the hydrophobic layer 32 to achieve anti-fingerprint function and provide a smooth touch sensation; utilizes the explosion-proof film 33 to increase the overall strength and toughness and prevent fragments splashing; utilizes the impact-resistant layer 34 to enhance the ability of impact resistance; utilizes the substrate 35 to further improve the strength and toughness; and utilizes the exhaust layer 36 to ensure a tight fit with the outer screen of the mobile phone.

The wear-resistant layer 31 is made of diamond coating, the hydrophobic layer 32 is made of AF oil, the antibacterial layer 14 is made of nano-silver coating, the buffer washer 2 and the exhaust layer 36 are both made of silica gel, the impact-resistant layer 34 is made of acrylic rubber and the impact resistant adhesive, and the substrate 35 is made of polyethylene terephthalate.

The first groove 11 and the notch 15 are used for bypassing the sound outlet hole of the mobile phone, the second groove 21 is used for adapting to the shape of the first groove 11, and the third groove 37 is used adapting to the shape of the second groove 21.

Since the second groove 21 is on the tempered glass 3, there are corresponding second grooves 21 on other functional layers and films based on the tempered glass 3. The bending portion 12 is used to wrap the tempered glass 3 and the functional layers and films thereon. The arc surface 13 is used to adapt to the edge arc of the mobile phone outer screen.

In the description of the present application, it should be noted that unless otherwise specified or limited expressly, the terms "installation", "connected", and "equipped" should be broadly understood, for example, they may be fixed, detachable, or integrated connections; may be a mechanical connection or an electrical connection; may be a direct connection or an indirect connection through an intermediate medium; may be a connection between two elements. For those skilled in the art, the specific meanings of the above terms in the present application can be understood in specific cases.

The device embodiments described above are only illustrative, wherein the units described as detached parts may or may not be physically separated, and the components displayed as units may or may not be physical units, that is, they can be located in one place or distributed over multiple network units. Some or all of the modules can be selected according to actual needs to achieve the purpose of the embodiment. It can be understood and implemented by a person of ordinary skill in the art without creative labor.

It should be appreciated that the above embodiments are only used to illustrate the technical solutions of the present application, not to limit them. Although the present application has been described in detail with reference to the foregoing embodiments, those skilled in the art should understand that the technical solutions described in the foregoing embodiments can still be modified or be replaced equivalently with some of the technical features, and these modifications or substitutions do not make the essence and the scope of the corresponding technical solutions detached from the spirit the present invention.

What is claimed is:

1. A super-hard and super-strong explosion-proof glass film with metal frame, comprising a frame body, a buffer washer and a tempered glass, wherein the frame body is provided with an antibacterial layer, the buffer washer is fixedly connected inside the frame body, and the tempered glass is fixedly connected inside the buffer washer.

2. The glass film of claim 1, wherein the frame body is provided with a bending portion, and the bending portion is provided with an arc surface.

3. The glass film of claim 1, wherein the frame body is provided with a first groove in which a notch is arranged, a second groove is provided at a position corresponding to the first groove on the buffer washer, and a third groove is provided at a position corresponding to the second groove on the tempered glass.

4. The glass film of claim 1, wherein the antibacterial layer is made of nano-silver material.

5. The glass film of claim 3, wherein the tempered glass has a lower surface fixedly connected with an explosion-proof film, the explosion-proof film has a lower surface fixedly connected with an impact-resistant layer, the impact-resistant layer has a lower surface fixedly connected with a substrate, the substrate has a lower surface fixedly connected with an exhaust layer which is provided at the top of the arc surface.

6. The glass film of claim 5, wherein the tempered glass has an upper surface fixedly connected with a wear-resistant layer, and a hydrophobic layer is provided on an upper surface of the wear-resistant layer.

* * * * *